United States Patent Office 3,317,425
Patented May 2, 1967

3,317,425
LUBRICATING COMPOSITIONS CONTAINING A CARBAMOYL PHOSPHINE
Ulrich Hasserodt, Hamburg, Bergedorf, Hans Fritzsche, Niederpleis, and Friedrich W.A.G.K. Korte, Hangelar, Germany, assignors to Shell Oil Company, New York, N.Y., a corporation of Delaware
No Drawing. Filed Apr. 26, 1965, Ser. No. 451,025
Claims priority, application Germany, Aug. 14, 1964, S 92,653
16 Claims. (Cl. 252—46.7)

This invention relates to improved lubricants possessing excellent corrosion and wear inhibiting properties, as well as enhanced oxidation stability at elevated temperatures and extreme pressures, and to new and novel oil additives therefor.

Numerous classes of oil additives are used for improving the properties of lubricating oils. Thus, various types of alkyl phenols and arylamines are used as antioxidants, some types of organic salts, e.g., metal phenolates and sulfonates are useful as detergents, esters such as organic phosphate esters and organic carboxylate esters or sulfurized free fatty acids, e.g., sulfurized oleic acid as antiwear and extreme pressure. Although in engines operating at moderate conditions of temperature and pressure these classes of oil additives are effective, in engines operating under extreme temperatures and extreme pressures, these materials tend to decompose and cause severe damage to the engines.

It has now been discovered that engines operating under extreme temperatures and pressures can be effectively lubricated with lubricating oils containing a small amount (0.05–2% by weight) of an oil-soluble monocarbamoyl phosphine derivatives having the formula (I)     $Y_2P(S)_n—C(X)—NHR$ where the Y's may be the same or different unsubstituted or substituted hydrocarbyl groups, R may be the same as Y or an acyl group, X can be oxygen or sulfur, preferably oxygen, n is an integer of zero or 1, preferably 1. Specifically, Y can be the same or different alkyl or aryl radicals, such as $C_{1-18}$ alkyl radical, e.g., ethyl, propyl, butyl, isobutyl, amyl, octyl, isoctyl, nonyl, decyl, dodecyl radicals or mono- or polyaryl radicals, e.g., phenyl, tolyl, xylyl, occtylphenyl, benzyl, naphthyl radicals, or polar-substituted hydrocarbyls such as with halogen (Cl, F, Br), amino, hydroxyl, alkoxyl, mercapto, alkylthio, sulfone, carboxyl or carbalkoxy groups and the like, e.g., p-dimethylaminophenyl, p-trifluoromethylphenyl groups and the like. The R symbol may be the same as Y or an acyl groups such as a benzoyl, acetyl, butyryl, isooctanoyl, lauroyl, stearoyl group and the like. The two groups Y may form, together with the phosphorus atom, a phospholenyl, phospholanyl, or phosphorine five member ring compound.

The monocarbamoyl compounds of the present invention represented by Formula I where n is zero in the above formula, can be prepared by reacting an organic isocyanate R—N=C=X, where X is oxygen or sulfur with a suitable organic phosphine in an inert organic solvent such as benzene or toluene, and, if desired, with heating at a temperature below 100° C. and preferably carrying out the reaction with the exclusion of oxygen. The organic isocyanates can be alkyl, aryl, alkoxyl or aroxyl isocyanates which may contain chlorine or nitro groups as substituents. Such compounds can be illustrated by chloroacetyl, trichloroacetyl, benzoyl, nitrobenzoyl isocyanates and isothiocyanates. The organic phosphines include dialkyl phosphines, diaryl phosphines, cyclic phosphines such as phospholanes or phosphorinanes, and the like.

When forming phosphine sulfides represented by Formula I where n is 1, they are prepared by reacting monocarbamoyl phosphines made by the process mentioned in the previous paragraph and reacting said compounds with sulfur or a sulfur-yielding compound such as thiourea or episulfides or the like in bulk or in solvents such as benzene, toluene or carbon disulfide at between 50 and 250° C.

The following examples illustrate products of the present invention having the formula (II)     $Y_2P—C(X)—NHR$ where Y, X and R are the same in ahe Formula I.

Example I 18.6 g. (0.1 mol) of diphenyl phosphine were added dropwise to a solution of 14.7 g. (0.1 mol) of benzoyl isocyanate in 30 cc. of dry benzene with the exclusion of air. The temperature of the mixture rose slightly. After 12 hours the N-benzoyl carbamoyl diphenyl phosphine, which had separated off was withdrawn by suction and recrystallized from benzene. Yield 30.2 g. (=90.7% of theory), of white crystals with a melting point of 133° C.
Calculated for $C_{20}H_{16}NO_2P$: C=72.07%; H=4.81%; N=4.20%; P=9.31%. Found: C=72.8%; H=4.8%; N=4.0%; P=9.0%.

Example II 12 g. (0.1 mol) of chloroacetyl isocyanate in 40 cc. of dry benzene were mixed with 18.6 g. (0.1 mol) of diphenyl phosphine, with the exclusion of oxygen. The mixture was left to stand for three hours, after which N-chloroacetyl carbamoyl diphenyl phosphine crystals were withdrawn by suction. After recrystallization from a 2:1 (vol.) benzene-petroleum ether mixture, 15.2 g. (=49.7% of theory) of the compound with a M.P. of 130°–131° C. were recovered.
Calculated for $C_{15}H_{13}NPO_2Cl$: P=10.15%. Found: P=10.5%.

Example III 9.3 g. (0.05 mol) of diphenyl phosphine were added dropwise with the exclusion of oxygen to a solution of 9.5 g. (0.05 mol) of trichloroacetyl isocyanate in 30 cc. of dry benzene. After one hour's stirring the precipitated crystals of N-trichloroacetyl carbamoyl diphenyl phosphine were withdrawn by suction and recrystallized from benzene-petroleum ether. M.P. 78°–79° C., yield 6.7 g. (=35.7% of theory).
Calculated for $C_{15}H_{11}NPO_2Cl_3$: C=48.06%; H=2.94%; N=3.74%; P=8.28; Cl=28.44%. Found: C=47.7%; H=3.5%; N=4.0%; P=8.9%; Cl=28.35%.

Example IV 13.8 g. of 2,3-dimethyl phospholine-2 were added under a nitrogen blanket to a solution of 14 g. of phenyl isocyanate in 80 ml. of dry benzene. After having been allowed to stand for several hours, the reaction mixture was boiled under reflux for half an hour. Crystals of N-phenyl carbamoyl-1(3,4-dimethyl)phospholine-2 crystallized out during cooling. These were withdrawn by suction, washed with benzene and recrystallized from ethanol. Yield 12.4 g.=45% of theory. M.P. 110° C.

Calculated for $C_{13}H_{16}NOP$: C=67.01%; H=6.92%; N=6.01%; P=13.32%. Found: C=67.4%; H=9.0%; N=5.4%; P=12.0%.

Example V 29.4 g. (0.2 mol) of dibutyl phosphine were added under a nitrogen blanket to 23.8 g. (0.2 mol) of phenyl isocyanate in 50 ml. of dry benzene. The reaction mixture was boiled under reflux for half an hour. After cooling, the precipitated di-n-butyl-(phenyl carbamoyl) phosphine was drawn off by suction and washed with petroleum ether. Yield 43.2 g.=85% of theory. M.P. 102° C. (from ethanol).

Calcultaed for $C_{15}H_{24}NOP$: C=67.98%; H=9.13%; N=5.29%; P=11.71%. Found: C=67.3%; H=9.0%; N=5.4%; P=12.0%.

Example VI 24 g. (0.2 mol) of phenyl isocyanate and 372 g. (0.2 mol) of diphenyl phosphine were boiled under reflux for half an hour in 200 ml. of benzene under a nitrogen blanket. The benzene was distilled off under reduced pressure and the residue was recrystallized from ethanol. Yield of diphenyl-(phenyl carbamoyl) phosphine 55 g.=90% of theory. M.P. 139° C.

Calculated for $C_{19}H_{16}NOP$: C=74.82%; H=5.29%; N=4.59%; P=10.16%. Found: C=75.0%; H=5.14%; N=4.5%; P=10.2%.

Example VII

A quantity of 10 g. of bis-(p-dimethyl aminophenyl) phosphine was added dropwise to a solution of 4.5 g. of phenyl isocyanate in 25 cc. of dry benzene with the exclusion of air. The temperature rose slightly; the solution was then boiled under reflux for half an hour. The benzene was distilled off and the residue recrystallized from benzene/petroleum ether. Yield of bis-(p-dimethyl aminophenyl)-phenylcarbamoyl phosphine: 13 g.=90.5% of theory. Analysis $C_{23}H_{26}N_3OP$ (391.12). Melting point 155° C.

Calculated: C=70.63%; H=6.70%; N=10.75%; P=7.93%. Found: C=68.9%; H=7.7%; N=11.7%; P=7.7%.

Example VIII

Following the procedure of Example VII, 55.8 g. of diphenyl phosphine and 29.7 g. of butyl isocyanate were reacted under reflux condition for two hours in 200 ml. of benzene to yield diphenyl butyl carbamoyl phosphine.

Example IX

Following the procedure of Example I, but in which bebnzoylthioisocyanate was used, the end product was N-benzoyl thiocarbamoyl diphenyl phosphine.

Example X

Following the procedure of Example II, but in which chloroacetyl thioisocyanate was used, the end product was N-chloroacetyl thiocarbamoyl 10 diphenyl phosphine.

The following examples of compounds of the present invention having the formula (III)        $Y_2P(S)$—$C(X)$—NHR where the symbols Y, X and R are the same as in Formula I, illustrate the preferred embodiment of the present invention. Essentially, the products of Examples I-X can be reacted in a solution of sulfur in benzene or $CS_2$ at 50-80° C. to form this novel class of compounds.

Example IA

Quantities of 3.9 g. (0.01 mol) of bis-(p-dimethyl aminophenyl)-phenylcarbamoyl phosphine and 0.32 g. (0.01 mol) of sulfur were boiled under reflux for an hour in 30 ml. of absolute benzene. The solvent was distilled off and the residue recrystallized from ethanol. Yield 3.8 g. of bis-(p-dimethyl aminophenyl)-phenylcarbamoyl phosphine sulfide=90% of theory. M.P. 160° C. Analysis $C_{23}H_{26}N_3POS$ (423.12).

Calculated: C=65.30%; H=6.20%; N=9.93%; S=7.58%; P=7.33%. Found: C=65.2%; H=6.8%; N=9.6%; S=7.9%; P=6.7%.

Example IIA

Following the procedure of Example IA about 14.5 g. of the compound of Example VI and 1.65 g. of sulfur were reacted to yield a phosphine sulfide having a melting point of 112° C. and, on analysis, the formula $C_{19}H_{16}OPNS$ (337)

Calculated: C=67.71%; H=4.79%; N=4.16%; S=9.52%; P=9.21%. Found: C=67.2%; H=4.9%; N=4.9%; S=9.6%; P=9.4%.

Example IIIA

To the diphenyl(butyl carbamoyl) phosphine prepared as in Example VIII, 4.8 g. of sulfur was added and the mixture refluxed for about an hour. The benzene was distilled off under reduced pressure. An undistillable oil remained which was washed several times with petroleum ether. Yield 85 g. of diphenyl-butylcarbamoyl phosphine sulfide=90% of theory. Analysis $C_{17}H_{20}NOSP$ (317.33).

Calculated: C=64.4%; H=6.36%; N=4.42%; P=10.79%; S=10.12%. Found: C=65.3%; H=7.1%; N=5.5%; P=10.6%; S=8.6%.

Example IVA

To about 7.5 g. of di-n-butyl-(phenyl carbamoyl) phosphine of Example V, about 0.92 g. of sulfur was added and the mixture refluxed for two hours in 30 ml. of benzene. The solvent was distilled off and the residue recrystallized from ethanol. Yield 52 g. of dibutyl-(phenyl carbamoyl) phosphine sulfide having a melting point of 32° C.

Example VA

A quantity of 13.8 g. of 3,4-dimethyl-$\Delta^2$-pholine was added under nitrogen to a solution of 14 g. of phenyl isocyanate in 80 ml. of dry benzene. After having been allowed to stand for four hours, the reaction mixture was boiled under reflux for half an hour. After cooling, the precipitate was withdrawn by suction, washed wtih benzene and recrystallized from ethanol. A yield of 1-phenylcarbamoyl-3,4-dimethyl-$\Delta^2$-pholine=45% of theory was obtianed. From 1 g. of this pholine and 0.136 g. of sulfur a yield of 0.8 g. of 1-phenylcarbamoyl-1-thiono-3,4-dimethyl-$\Delta^2$-pholine (=70% of theory) was obtained in the manner described above. Melting point 72°.

Example VIA

To about 13.9 g. of the compound of Example I about 1.2 g. of sulfur was added and the reaction conducted as in Example VI to yield 60% of diphenyl(benzoyl carbamoyl) phosphine sulfide having a melting point of 118° C.

Example VIIA

In a manner similar to that of Example I, 55.2 g. of diphenyl-(phenyl thiocarbamoyl)phosphine with a melting point of 118° C. were obtained from 27.0 g. of phenyl mustard oil in 200 ml. of benzene and 37.2 g. of diphenyl phosphine. Analysis $C_{19}H_{16}NPS$ (321.39).

Calculated: C=71.09%; H=5.92%; N=4.36%; P=9.65%; S=9.99%. Found: C=71.0%; H=5.0%; N=5.1%; P=9.2%; S=9.9%.

From 16.5 g. of diphenyl—(phenyl thiocarbamoyl) phosphine and 1.6 g. of sulfur, 15 g. (=83% of theory) of diphenyl—(phenyl thiocarbamoyl)phosphine sulfide were then obtained. Melting point 135° C. (from ethanol/benzene 3:1). Analysis $C_{19}H_{16}PS_2N$ (354).

Calculated: C=64.46%; H=4.56%; N=3.96%; P=8.75%; S=18.12%. Found: C=63.8%; H=4.2%; N=3.7%; P=9.4%; S=18.5%.

The novel compounds of this invention confer properties on the lubricating oils which make the latter extremely active with respect to their anti-oxidant effect, and with respect to a very slight degree of engine wear, when they are used for lubricating internal combustion engines. They have a particularly favorable effect with engines of the spark ignition type driven by fuels containing metal-containing substances such as organo-metallic anti-knock agents. This favorable effect is obtained with a great variety of hydrocarbon lubricating oils, irrespective of whether they are mineral or synthetic hydrocarbon oils. Oils having an essentially paraffinic and/or naphthenic character are preferred. They may contain considerable quantities of hydrocarbons with an aromatic character. However, the proportions and the types of the components are preferably such that the viscosity index of the base oil is at least 80 and preferably between 90 and 150. The viscosity may vary within wide limits so that the oils belong, for example, to the classes 5W, 10W, 20W, 20, 30, 40, or 50. In general, those lubricating oils are suitable which have a viscosity range of from 50 SUS at 37.8° C. to 250 SUS at 98.9° C.

The oil may be derived from a highly paraffinic crude oil. In this case, a distillation and/or a dewaxing treatment may be sufficient to obtain a suitable starting oil. If desired, a treatment with small amounts of chemicals or of a selective solvent may be applied. Mixed base crude oils and even highly aromatic crude oils which contain paraffinic hydrocarbons, also yield a suitable starting oil if they are treated by a known refining process. In general, a refining process of this type comprises separation of the crude oil into distillate fractions of a suitable boiling range, and subsequent selective solvent extraction by means of solvents, such as furfural or phenol, in order to obtain raffinate fractions which may suitably be further refined by means of dewaxing and chemical treatment, for example, treatment with sulfuric acid. The hydrocarbon oils may be mixtures of various mineral oil distillates and of bright stocks. It is also possible to use mixtures of mineral oils and fatty oils, such as castor oil and lard oil, and/or synthetic lubricants such as polymerized olefins, for example polyisobutylene in the molecular weight range of 5,000 to 100,000.

It was also found that the novel phosphine compounds develop their anti-oxidant effect gradually under engine operating conditions, as is shown by Table I, i.e., the anti-oxidant effect is still increased by heating the lubricant composition according to the invention, as also occurs, for example, in the engine.

The phosphine compounds, particularly the phosphine sulfides incorporated according to the present invention may be used as lubricant additives in quantities of from 0.05 to about 20%, preferably between about 0.1 to about 5% by weight, based on the total lubricating oil composition.

If desired, further improvements in the oxidation stability and of anti-scuffing effect may be achieved in the lubricants according to the invention containing the novel carbamoyl phosphine sulfides, by also incorporating therein minor proportions of phenolic anti-oxidants, such as alkyl phenols, for example 2,6-ditert-butyl-4-methyl phenol, or p,p'-methylene bisphenols such as 4,4'-methylene-bis(2,6-ditert-butyl phenol), or aryl amines such as phenyl-alpha-naphthyl amine, or dialkyl sulfides such as dibenzyl disulfide or didodecyl sulfide. Other additives which can be used are certain organic phosphites, phosphates, phosphonates or the thio derivatives thereof, such as $C_{3-18}$-alkyl phosphites or phosphonates, for example, di- and tributyl, octyl, lauryl, stearyl, cyclohexyl, benzyl, cresyl and phenyl phosphite or phosphate or the thio derivatives thereof. $P_2S_5$-terpene reaction products, such as $P_2S_5$ olefin oil reaction products or alkali metal salts thereof, for example, the potassium salt of a $P_2S_5$-terpene reaction product, are also suitable additives. In addition, phosphonates, such as dibutyl methane phosphonate, dibutyl trichloromethane phosphonate, dibutyl monochloromethane phosphonate and dibutyl chlorobenzene phosphonate, may be added to the lubricants according to the invention. Within the scope of the invention the complete esters of acids of pentavalent phosphorus, such as triphenyl, tricresyl, trilauryl and tristearyl orthophosphate, as well as the potassium salt of a $P_2S_5$-terpene reaction product, are preferred as additives.

The following compositions A to D illustrate the invention in more detail, the numerical values relating to percentages by weight.

Composition A:
  Mineral oil SAE 90 _____ 99.5
  Phosphine sulfide according to Example IVA __ 0.5
Composition B:
  Mineral oil SAE 10 _____ 89
  Glycerol mono-oleate _____ 10
  Phosphine sulfide according to Example IIIA __ 1
Composition C:
  Mineral oil SAE 10W _____ 93
  Bis - (3,5 - ditert - butyl - 4 - hydroxy benzyl) sulfide _____ 0.5
  Phosphine sulfide according to Example IIA __ 0.1
  Tricresylphosphate _____ 0.8
  Copolymer from 2.5 mol of stearyl methacrylate 5 mol of lauryl methacrylate and 1 mol of 2-methyl-5 vinyl pyridine. Molecular weight 750,000 _____ 5.6

The anti-oxidant effect of the phosphine sulfides were determined according to the so-called "SCOT" method. As base oil, use was made of Shell Oil BC 8, a lubricating oil refined with sulfuric acid and having a viscosity of 32 centistokes (4.2° E. at 50° C.). Solutions of copper stearate (103 mg.) and iron stearate (102 mg.) in 497.5 ml. of toluene and 2.5 ml. of acetone were prepared. 10 ml. of each solution were introduced into a reaction flask and the solvent removed at 60° C. The light blue residue was dissolved in 5 g. of BC 8 oil and 10 g. of the carbamoyl phosphine sulfide being tested were added in each case. The flask was shaken under oxygen at 160° C. The induction period was measured in minutes until 25 ml. of oxygen had been consumed, and the results are shown in Table I.

TABLE I

| Test Substance | Induction Period | |
| --- | --- | --- |
| | Not Preheated | Preheated to 160° C. Under Nitrogen for 45 Minutes |
| Base Oil BC 8 | 6 | |
| 4,4'-methylene-bis(2,6-ditert-butyl phenol) | 117 | |
| $(C_6H_5)_2P(S)$—C(O)—NH—C(O)—$C_6H_5$ (Example VIA) | 535 | 955 |
| $(C_6H_5)_2P(S)$—C(O)—NH—$C_4H_9$ (Example IIIA) | 300 | |
| $(n-C_4H_9)_2P(S)$—C(O)—NH$C_6H_5$ (Example IVA) | 228 | |
| 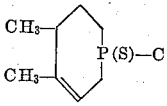 (Example VA) | 510 | |
| $(C_6H_5)_2P(S)$—C(S)—NH—$C_6H_5$ (Example VIIA) | 500 | |

The carbamoyl phosphine sulfides were further tested in the so-called Petter engine. This test is described in the "Journal of the Institute of Petroleum Technology," August 1953, pages 507 ff. As base oil use was made of a Kirkuk 160 B oil with a viscosity of 38.8 centistokes at 60° C. The results are shown in Table II.

TABLE II

| Test Substance | Amount, percent by Weight | Duration of Test in hours | Bearing Weight loss, mg. | Piston Cleanliness (10=very good) | | |
|---|---|---|---|---|---|---|
| | | | | Skirt | Under Crown | Oil Ring |
| None | | 36 | 1,593 | 5.0 | 5.6 | 8.5 |
| 4,4'-methylene-bis (2,6-ditert-butyl-phenol) | 0.5 | 36 | 12 | 5.0 | 4.5 | 3.0 |
| | | 48 | 37 | 5.0 | 5.3 | |
| | | 60 | 199 | 4.0 | 6.0 | 5.0 |
| $(C_6H_5)_2P(S)$—C(O)—NH—C(O)—$C_6H_5$ | 0.2 | 36 | 90 | 5.5 | 7.5 | 8.0 |
| $(C_6H_5)_2P(S)$—C(O)—NH—$C_4H_9$ | 0.2 | 36 | 6 | 6.0 | 7.0 | 9.0 |
| | 0.2 | 48 | 33 | 5.0 | 6.5 | 8.5 |
| | 0.2 | 60 | 108 | 5.0 | 6.5 | 8.0 |

The lubricating oil compositions according to the invention were further tested with respect to their rust inhibiting properties according to the ASTM method D 665-60. The phosphine sulfide was used in a concentration 0.1 and 0.2% by weight in a HVI 65 base oil. The test was carried out for 24 hours at 60° C. in salt water and 0.01 N sulfuric acid. The results are shown in Table III.

TABLE III

| Test Substance | Amount, percent by Weight | Percentage of Rust in— | |
|---|---|---|---|
| | | Salt Water | 0.01 N $H_2SO_4$ |
| Base oil without additives | | 50% in 30 min | 50% in 30 min. |
| $(C_6H_5)_2P(S)$—C(O)—NH—n$C_4H_9$ | 0.1 | 5% in 24 hours | None. |
| | 0.2 | None | Do. |
| $(C_6H_5)_2P(S)$—C(O)—NH—$C_6H_5$ | 0.1 | ......do...... | Do. |
| $(C_6H_5)_2P(S)$—C(S)—NH)$C_6H_5$ | 0.1 | ......do...... | 5% in 2 hours. |

The lubricating oil compositions according to the invention may be used in engines for automobiles, buses, airplanes, tractors and diesel-driven vehicles and may be employed in the lubrication of a variety of other industrial equipment.

We claim as our invention:

1. A lubricating oil composition comprising a major amount of lubricating oil and from about 0.05% to about 2% of an oil-soluble monocarbamoyl phosphine having the formula

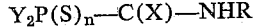

$$Y_2P(S)_n\text{—}C(X)\text{—}NHR$$

where the Y is selected from the group consisting of alkyl and aryl groups, R is selected from the group consisting of alkyl, aryl and acyl groups wherein the acyl groups are derived from aromatic carboxylic and alkanoic acids, X is selected from the group consisting of oxygen and sulfur and $n$ is an integer of from zero to 1.

2. The composition of claim 1 where Y is selected from the group consisting of alkyl and aryl groups, X is oxygen and $n$ is zero.

3. The composition of claim 1 where Y is selected from the group consisting of alkyl and aryl groups, X is oxygen and $n$ is 1.

4. The composition of claim 1 where Y is selected from the group consisting of alkyl and aryl groups, R is selected from the group consisting of alkyl, aryl and acyl groups wherein the acyl groups are derived from aromatic carboxylic and alkanoic acids, X is oxygen and $n$ is zero.

5. The composition of claim 1 where Y is selected from the group consisting of alkyl and aryl groups, R is selected from the group consisting of alkyl, aryl and acyl groups wherein the acyl groups are derived from aromatic carboxylic and alkanoic acids, X is oxygen and $n$ is 1.

6. A mineral lubricating oil composition comprising a major amount of mineral lubricating oil and from about 0.1% to about 5% of an oil-soluble diaryl (N-aryl carbamoyl) phosphine.

7. A mineral lubricating oil compostion comprising a major amount of mineral lubricating oil and from about 0.1% to about 5% of an oil-soluble dialkyl (N-aryl carbamoyl) phosphine.

8. A mineral lubricating oil composition comprising a major amount of mineral lubricating oil and from about 0.1% to about 5% of an oil-soluble diaryl (N-alkyl carbamoyl) phosphine.

9. A mineral lubricating oil composition comprising a major amount of mineral lubricating oil and from about 0.1% to about 5% of an oil-soluble diaryl (N-acyl carbamoyl) phosphine, said acyl group being derived from an acid selected from the group consisting of aromatic carboxylic acids and alkanoic acids.

10. A mineral lubricating oil composition comprising a major amount of mineral lubricating oil and from about 0.1% to about 5% of an oil-soluble diaryl (N-aryl carbamoyl) phosphine sulfide.

11. A mineral lubricating oil composition comprising a major amount of mineral lubricating oil and from about 0.1% to about 5% of an oil-soluble dialkyl (N-aryl carbamoyl) phosphine sulfide.

12. A mineral lubricating oil composition comprising a major amount of mineral lubricating oil and from about 0.1% to about 5% of an oil-soluble diaryl (N-alkyl carbamoyl) phosphine sulfide.

13. A mineral lubricating oil composition comprising a major amount of mineral lubricating oil and from about 0.1% to about 5% of an oil-soluble diaryl (N-acyl carbamoyl) phosphine sulfide, said acyl group being derived from an acid selected from the group consisting of aromatic carboxylic acids and alkanoic acids.

14. A mineral lubricating oil composition comprising a major amount of mineral lubricating oil and from about 0.1% to about 5% of an oil-soluble diphenyl (N-phenyl carbamoyl) phosphine sulfide.

15. A mineral lubricating oil composition comprising a major amount of mineral lubricating oil and from about 0.1% to about 5% of an oil-soluble dibutyl (N-phenyl carbamoyl) phosphine sulfide.

16. A mineral lubricating oil composition comprising a major amount of mineral lubricating oil and from about 0.1% to about 5% of an oil-soluble diphenyl (N-benzoyl carbamoyl) phosphine sulfide.

References Cited by the Examiner

UNITED STATES PATENTS

| | | | |
|---|---|---|---|
| 3,005,010 | 10/1961 | Grisley | 252—49.9 |
| 3,066,140 | 11/1962 | Speziale | 252—49.9 |
| 3,136,801 | 6/1964 | Hopkins | 252—46.7 |

DANIEL E. WYMAN, *Primary Examiner.*

L. G. XIARHOS, *Assistant Examiner.*